United States Patent

[11] 3,550,916

[72] Inventors Klaus Hoppe;
  Gerhard Krueger, Magdeburg, Germany
[21] Appl. No. 780,069
[22] Filed Nov. 29, 1968
[45] Patented Dec. 29, 1970
[73] Assignee Veb Germania Chemieanlagen-Und Apparatebau

[54] HIGH CAPACITY MASS TRANSFER PLATE FOR COLUMNS
  7 Claims, 4 Drawing Figs.
[52] U.S. Cl............................................. 261/114,
  34/57, 34/171
[51] Int. Cl..................................................... B01d 3/16
[50] Field of Search.........................................261/114(J.P.);
  34/57T, 171

[56] References Cited
  UNITED STATES PATENTS
2,737,377  3/1956  Huggins et al. ............... 261/114(j.p.)
2,784,953  3/1957  Ng................................. 261/114(j.p.)
3,062,517  11/1962  Voetter et al.................. 261/114(j.p.)
3,156,746  11/1964  Kittel............................ 261/114(j.p.)

FOREIGN PATENTS
744,906  2/1956  Great Britain................ 261/114(j.p.)

Primary Examiner—Tim R. Miles
Attorney—Nolte and Nolte

ABSTRACT: In a column for contact of a liquid or a fluidized particulate solid with a gas or vapor in which the column is upright and the gas or vapor is directed in a net upward direction through the column, a substantially horizontal plate extending substantially across the internal diameter of the column, means for causing flow of the liquid or fluidized particulate solid across the plate, the plate being provided with openings for passage of the gas or vapor therethrough, the openings being upwardly inclined at acute angles relative both to the plane of the plate and in the plane of the plate to the net direction of flow (mainstream direction) of the liquid or the solid across the plate, and the plate having at least three zones extending across the plate transversely to the net direction of flow, the zones each being characterized by the acute angle in the plane of the plate between the openings contained therein and the net flow direction being different from the corresponding angle of the openings contained in the zone or zones contiguous therewith.

MAINSTREAM DIRECTION

MAINSTREAM DIRECTION

MAINSTREAM DIRECTION

INVENTORS
KLAUS HOPPE
GERHARD KRUEGER

BY

*Nolte & Nolte*

ATTORNEYS

HIGH CAPACITY MASS TRANSFER PLATE FOR COLUMNS

This invention relates to a high capacity exchange or mass transfer plate for columns, particularly columns for various materials separation processes, such as, for example, absorption, desorption, distillation, rectification, extraction, washing and adsorption and for direct heat exchange.

In industry, crosscurrent plates of various constructions are known. One type of the these known crosscurrent plates is the so-called jet plate. There are various constructions possible for such plates which utilize the jet principle, i.e., operation similar to the principle of a jet, for example by flaps stamped out from the sheet metal of the plate, obliquely arranged sheet metal flanges on the sheet metal of the plate, specially slit plates (so-called turbogrid plates with oblique slits), and the like.

Jet plates have the disadvantage that the stream conditions resulting from the strong jet effect are not especially favorable for two phase contact, whereby there is substantial risk of the fluid fed transversely of the plate simply blasting through the fluid bed along the plate. Furthermore, these constructions result in a very short residence time of the fluid on the plates. Consequently, the contact time between the flowing phases is very short. Furthermore, the cross-stream plates in the case of liquid being fed along the plate and gas being fed transversely of the plate tend to cause the liquid to spray about the plate without contact therewith. The above mentioned extremely short residence time and the limitation of contact between the materials and the plates due to droplet and spray formation leads to a very limited separation effect.

In recent times, there has become known a type of plate, which likewise works on the jet principle, which is known as a lamellar plate. It is constituted of inclined, overlapping sheet metal strips which assure a specific slit opening. The lamellar plates operate hydraulically in the so-called "drop regime," i.e., it does not cause the formation of cohering gas or vapor and liquid layers on the exchange plate but, rather, by virtue of the strong jet effect, the liquid is sprayed about the plate in drop form. This leads to a very short residence time of the liquid on the plate and to very short contact times between the gas or vapor and the liquid and, accordingly, to a low separation effect for the plate.

Under the name "Scheinmann plate" a further type of plate, which works according to the crosscurrent principle, is known. This plate is constituted of a rolled metal sheet which constitutes the entire surface of the plate and which is provided with slits uniformly oriented in the direction of the outflow. Over the plate are stream breakers which are constituted of rolled metal with larger slits than the aforementioned slits and which are arranged somewhat inclined against the stream direction.

By the use of stream breakers, the disadvantages of plates which operate according to the jet principle are indeed lessened. However, even with this type of plate the stream conditions are not sufficiently improved, because by high charging at the base of the plate, namely at that portion in which the gas or vapor throughput openings oriented toward the outlet are provided, the above referred to disadvantages still exist.

According to the present invention, there is provided a high capacity exchange plate which provides favorable conditions for material exchange at higher charges and, thereby, notably decreases disadvantages of plates which operate according to the jet principle. More specifically, according to the invention, the plate is so shaped that there is provided an orientation of gas or vapor throughput openings such that an increase in separation effect is assured.

The plate, according to the invention, is constructed according to the cross-stream principle and in the direction across the mainstream of the fluid to be contacted with the gas or vapor is divided into at least three segments. The throughput openings of the individual segments are so arranged that the orientation of the throughput openings is in the plane of the plate at an acute angle to the direction of the mainstream of the fluidized solid or the liquid, which is fed along the plate, and this angle varies from segment to segment. The "mainstream" is the net flow and the "direction of the mainstream" is, accordingly, the net direction of flow. Preferably, the sense of the aforementioned angle changes from zone to zone. The operation of the plate, according to the invention, is most favorable if the plate is constituted of expanded metal. The aforementioned angle is preferably in the range of from 30 to 60°. The angle between the orientation of the openings and the plane of the plate is preferably from 10 to 60°. Above the plate and across the mainstream direction, one or more known stream breakers and a likewise already known inlet weir may be arranged.

The lengthening of the stream path of the liquid or solid and the therewith-occuring swirling of phases and the avoidance of the risk of a blasting through of the gas or vapor are all effected by the plate of the invention, which also assures an intensification of contact between the phases as compared with basic cross-stream plates and thereby causes improvement in the separation effect. The disadvantageous carryover of liquid or solid from plate to plate as well as to the outlet passage is eliminated by the plates according to the invention. The improvement in the separation effect leads to a requirement for a lesser effective plate number for a column for a given exchange process. Moreover, the higher capacity of the exchange plates according to the invention makes possible a decrease in the necessary plate diameter.

The invention will now be further described by reference to the drawings, in which.

Figure 1:
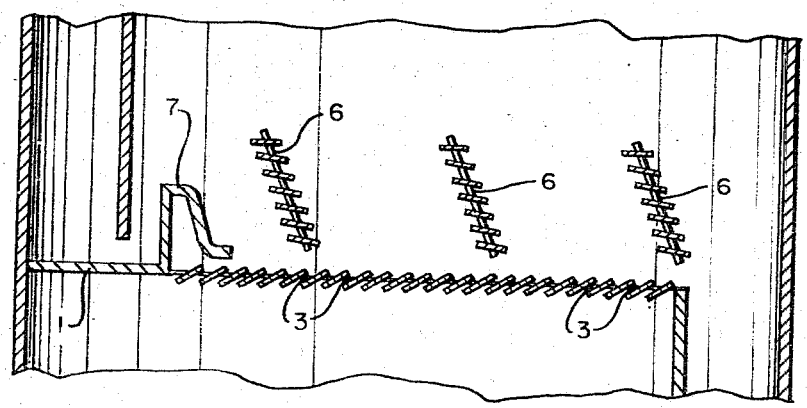
FIG. 1 is a vertical cross section view through a section of a column including a plate according to the invention.
Figure 2:
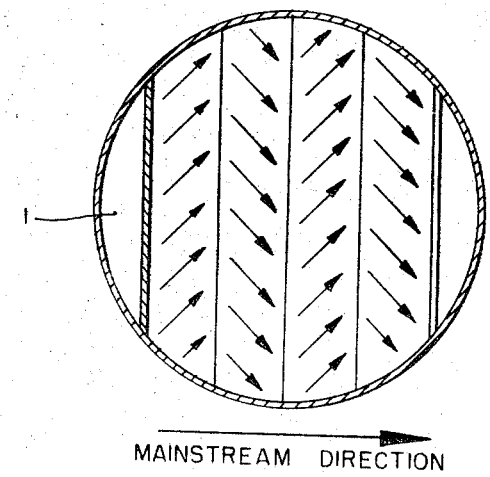
FIG. 2 is a schematic plan view of the plate shown in FIG. 1.
Figure 3:
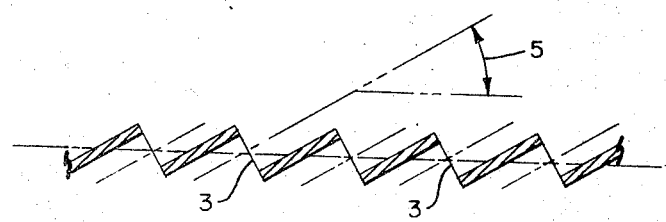
FIG. 3 is an enlargement of a portion of the plate as shown in FIG. 1.
Figure 4:
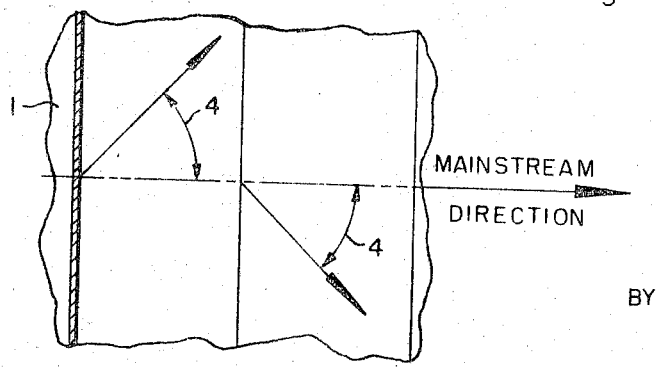
FIG. 4 is an enlargement of a portion of FIG. 2.

A liquid flows over an inlet weir 7 (FIG. 1) and across the plate 1 in the net direction designated "mainstream direction" in FIGS. 2 and 4. Gas throughput openings 3 (FIG. 3) in the plate 1 are inclined at an angle 5 from the plane of the plate of 30°. This angle may remain the same along the entire plate. However, with respect to the angle 4 in the plane of the plate between the openings 3 and the mainstream direction, the plate is divided into four sections. As schematically illustrated in FIGS. 2 and 4, the angle 4 between the direction of the openings as projected on the plane of the plate and the mainstream direction varies from 45° to one side of the mainstream direction (i.e., in one sense) to 45° to the other side of the mainstream direction (i.e., in the opposite sense) and by these variations the plate is divided into four sections or zones. While the overall direction of the liquid, i.e., the mainstream direction, is as indicated, the force of the gas or vapor flowing obliquely upwardly through the openings 3 causes the liquid locally to undergo direction changes from zone to zone whereby the path of the liquid across the plate 1 and consequently the residence time of the liquid on the plate are lengthened. Moreover, by virtue of the repeated direction changes, swirling of the liquid is produced and the turbulence thereof is increased whereby an additional generation of contact surfaces is attained.

Stream breakers 6 (FIG. 1) may be provided to further decrease the mainstream velocity of the fluid across the plate and to decrease entrainment.

While the invention is described by reference to a specific embodiment thereof, it is to be understood that the invention is not to be considered thereby limited but rather the scope thereof is to be determined by reference to the appended claims.

We claim:

1. In a column for contact of a liquid or a fluidized particulate solid with a gas or vapor in which the column is upright and the gas or vapor is directed in a net upward direction through the column, a substantially horizontal plate extending substantially across the internal diameter of the column, means for causing net flow of said liquid or fluidized particulate solid substantially diametrically across the plate, said plate being provided with openings for passage of the gas or vapor therethrough, said openings being upwardly inclined at acute angles relative both to the plane of the plate and in the plane of the plate, in the direction of their upward inclination, to the net direction of flow of the liquid or the solid across the plate, and said plate having at least three zones extending across the plate substantially perpendicularly to said net direction of flow, said zones each being characterized by said acute angle in the plane of the plate between the openings contained therein and the net flow direction being different from the corresponding angle of the openings contained in the zone or zones contiguous therewith.

2. In a column according to claim 1, in which said acute angle between the openings and the plane of the plate is from 10 to 60°.

3. In a column according to claim 2, in which said acute angle in the plane of the plate between the openings in each of the zones and the net flow direction is from 30 to 60°.

4. In a column according to claim 3, in which in the plane of the plate the inclination of the openings to the net flow direction in each zone is in a sense opposite to the sense of the inclination in the zone or zones contiguous therewith.

5. In a column according to claim 1, in which said plate is constituted of expanded metal.

6. In a column according to claim 1, in which said means for causing flow of said liquid or fluidized solid comprises a weir extending above the plate.

7. In a column according to claim 6, further comprising stream breaker means positioned to disturb the flow across the plate.